(12) United States Patent
Dogan

(10) Patent No.: US 11,964,814 B2
(45) Date of Patent: Apr. 23, 2024

(54) CAPSULE WITH FOAMING MEANS

(71) Applicant: SOCIETE DES PRODUITS NESTLE S.A., Vevey (CH)

(72) Inventor: Nihan Dogan, La Croix-sur-Lutry (CH)

(73) Assignee: Societe des Produits Nestle S.A., Vevey (CH)

( * ) Notice: Subject to any disclaimer, the term of this patent is extended or adjusted under 35 U.S.C. 154(b) by 97 days.

(21) Appl. No.: 17/275,280

(22) PCT Filed: Sep. 6, 2019

(86) PCT No.: PCT/EP2019/073782
§ 371 (c)(1),
(2) Date: Mar. 11, 2021

(87) PCT Pub. No.: WO2020/053076
PCT Pub. Date: Mar. 19, 2020

(65) Prior Publication Data
US 2022/0048701 A1 Feb. 17, 2022

(30) Foreign Application Priority Data

Sep. 14, 2018 (EP) ..................... 18194492

(51) Int. Cl.
*B65D 85/804* (2006.01)
*A23L 2/54* (2006.01)

(52) U.S. Cl.
CPC ............ *B65D 85/8055* (2020.05); *A23L 2/54* (2013.01); *B65D 85/8049* (2020.05);
(Continued)

(58) Field of Classification Search
CPC .......................................... B65D 85/804–8067
See application file for complete search history.

(56) References Cited

U.S. PATENT DOCUMENTS

| 2,292,101 A | * | 8/1942 | Francis | .............. | B65D 85/8061 |
| | | | | | 426/77 |
| 4,853,234 A | * | 8/1989 | Bentley | .............. | B65D 85/8052 |
| | | | | | D7/400 |

(Continued)

FOREIGN PATENT DOCUMENTS

| CA | 2498811 A1 | 4/2004 |
| JP | 2013507995 A | 3/2013 |

(Continued)

OTHER PUBLICATIONS

Indian Office Action for Appl No. 202117001550 dated Sep. 16, 2022.

*Primary Examiner* — Drew E Becker
*Assistant Examiner* — Chaim A Smith
(74) *Attorney, Agent, or Firm* — K&L Gates LLP

(57) ABSTRACT

A capsule for use in a beverage preparation machine capable of making a beverage with a foam. The capsule comprising an ingredient chamber for containing an ingredient for preparing the beverage and at least one gas reservoir containing gas. The at least one gas reservoir having an opening within the capsule, the opening adjacent a flow path for liquid through the capsule such that the gas reservoir is in fluid communication with the flow path, the at least one gas reservoir arranged such that, in use, liquid flowing past the opening entrains gas from the gas reservoir to form a foam-like mixture of gas and liquid.

15 Claims, 4 Drawing Sheets

(52) U.S. Cl.
CPC ..... *B65D 85/8052* (2020.05); *B65D 85/8067* (2020.05); *A23V 2002/00* (2013.01)

(56) References Cited

U.S. PATENT DOCUMENTS

| | | | | |
|---|---|---|---|---|
| 2004/0177765 | A1* | 9/2004 | Halliday | A47J 31/4407 |
| | | | | 99/279 |
| 2004/0228955 | A1* | 11/2004 | Denisart | B65D 85/8043 |
| | | | | 426/590 |
| 2005/0051478 | A1* | 3/2005 | Karanikos | B65D 85/8061 |
| | | | | 210/477 |
| 2005/0084569 | A1 | 4/2005 | Hu et al. | |
| 2009/0206084 | A1* | 8/2009 | Woolf | B65D 81/3205 |
| | | | | 426/597 |
| 2010/0034929 | A1* | 2/2010 | Dogan | B65D 85/8055 |
| | | | | 426/89 |

FOREIGN PATENT DOCUMENTS

| | | |
|---|---|---|
| WO | 2006066622 A1 | 6/2006 |
| WO | 2010128028 | 11/2010 |
| WO | 2014082924 | 6/2014 |
| WO | 2016081477 | 5/2016 |
| WO | 2017125267 | 7/2017 |

\* cited by examiner

CAPSULE WITH FOAMING MEANS

CROSS REFERENCE TO RELATED APPLICATIONS

The present application is a National Stage of International Application No. PCT/EP2019/073782, filed on Sep. 6, 2019, which claims priority to European Patent Application No. 18194492.7, filed on Sep. 14, 2018, the entire contents of which are being incorporated herein by reference.

TECHNICAL FIELD

This disclosure relates to a capsule for use in preparing a beverage and in particular to a machine that is able to prepare a beverage having a foam. Particularly, but not exclusively, the machine is able to prepare a milk- or coffee-based beverage providing the consumer with a foam content to the beverage.

BACKGROUND

A beverage can be created from a specially-designed capsule containing a beverage ingredient. Various approaches to aerating beverages have been used to provide satisfactory drinks for consumers. For example, in a typical conventional arrangement, an ingredient capsule is inserted into a beverage preparation machine, the machine being equipped with a water source (generally a water reservoir), a capsule receiver (so-called brewing chamber) and pump arranged to circulate the water from the water source towards and through the capsule to create a drink such as a coffee or the like.

When the water reaches the capsule it mixes with the ingredient to form a beverage product. The machine generally comprises a water heater to heat the water to a predetermined temperature before it is injected into and through the capsule. In general, liquid (for example water) is introduced into the capsule where it mixes with a beverage ingredient (for example milk powder) before leaving the capsule as a beverage. One capsule design mixes atmospheric air with the liquid to aerate the beverage.

One example of such an arrangement is a Venturi system. Capsules that can aerate a liquid via a Venturi conventionally include an aperture or hole in an outer wall of the capsule through which air is drawn from the outside atmosphere when liquid flows through the capsule. The air is conveniently sourced from the ambient atmosphere outside of the capsule and is drawn into the capsule by the speed of the liquid circulation inside the capsule i.e. using the Venturi principle.

Another design includes a gas source material, such as a molecular sieve. Under appropriate conditions the material releases gas into the liquid that flows past it creating an aerated liquid.

Another design includes an elastically-deformable membrane that can draw air into a pocket for mixing with a liquid within the pocket. In this design, a liquid introduced into the pocket deforms the membrane such that the liquid is expelled through an outlet. This expulsion reduces the pressure in the pocket, such that the membrane returns to an initial position and in doing so draws air into the pocket through the liquid outlet.

The inventors have devised an alternative way in which a superior and reliable foam can be achieved in a short period of time that is more appealing to a consumer.

SUMMARY OF THE INVENTION

According to a first aspect of an invention described herein there is provided a capsule for use in a beverage preparation machine, for preparing a beverage with a foam, the capsule comprising an ingredient chamber for containing an ingredient for preparing the beverage and at least one gas reservoir containing gas, the at least one gas reservoir having an opening within the capsule, the opening adjacent a flow path for liquid through the capsule such that the gas reservoir is in fluid communication with the flow path, the at least one gas reservoir arranged such that, in use, liquid flowing past the opening entrains gas from the gas reservoir to form a foam-like mixture of gas and liquid.

Unconventionally a capsule according to an invention described herein incorporates a gas reservoir within the capsule itself. Containing a gas in the capsule is counterintuitive since it requires a more complex capsule with a gas chamber and associated channels and manufacturing difficulties.

However, the inventors have established that creating a foam in this way has a number of advantageous effects. For example there is no requirement for an ambient air inlet into the capsule. Furthermore the gas can be selected to optimise the brewing or preparation process and quality control of the consumer product can be maintained to a very high standard.

A conventional capsule arranged to aerate a beverage does not achieve the same performance.

The term 'foam' is used herein to refer to the effect of gas bubbles trapped within a liquid, such as milk for example. The foam traps many gas bubbles within the liquid increasing the liquid volume and providing a different drinking experience. Sometimes referred to as a 'froth' a foam has a smooth texture on the palate and is pleasant to consume. It is therefore popular with consumers. Many consumers favour a drink having a foam layer on the top or a foam incorporated or blended with the drink itself.

The capsule of the present disclosure allows a predetermined quantity of gas and also gas type and quality to be blended with the liquid beverage at the time of preparation. Thus a consistent and high-quality beverage can be prepared reliably according to an invention and method described herein.

Referring to conventional aeration devices, and thus in contrast to conventional Venturi systems that source air from atmosphere outside of the capsule itself, the capsule of the present disclosure can require a less complex capsule construction, since the capsule does not need to comprise complex circulation channels for air, and for liquid, which join within the capsule to ensure that the gas and liquid circulation mate to allow the Venturi effect to create a foam.

Furthermore, in contrast to conventional Venturi systems that function using atmospherically sourced air, there is no need for a dedicated hole or aperture through the capsule wall. Thus, problems with the barrier to oxygen and moisture can be reduced (this is because when a hole is present, the seal cannot be guaranteed). Thus, this can increase the shelf-life of the product. Further, as there is no need for a hole through the capsule wall (which in a Venturi system must be small enough to work properly), there is no risk that this hole may clog, such that the production of foam using the capsule can be more reliable.

In contrast to capsule designs including a gas source material such as a molecular sieve fewer different materials can be used in the present capsule, since the inclusion of a gas source material can be dispensed with. The benefits of the present capsule can therefore be realized using the materials which would be used in a conventional capsule; that is, one not suitable for preparing a beverage with a foam.

In contrast to designs with an elastically-deformable membrane, fewer components and fewer different materials can be used to form the capsule of the present disclosure. Still further, the benefits of the present capsule can be realized with no moving parts since the benefits can be realized without the inclusion of the elastically-deformable membrane described above in the "Background" section of this disclosure.

The capsule may comprise one or more gas reservoirs or chambers entirely self-contained with the capsule. Thus, as described above, no external holes or passages are required to source air or gas from outside of the capsule. Advantageously, at least one gas reservoir may be at least partially defined by a rigid plate in the capsule that is arranged to open a frangible capsule wall. This provides for a compact capsule.

Such a rigid plate may comprise an opening means able to pierce, puncture, tear, or exert a mechanical lever effect onto the frangible capsule wall. Thus, the wall may be opened during use of the capsule by at least partial destruction of said wall. An example of such an arrangement can be found in European patent application number EP1472156B1, incorporated herein by reference.

Furthermore, the at least one gas reservoir may be at least partially defined by a part of the body of the capsule. This again provides for a compact capsule size and simple design within minimal materials.

An opposing part of the reservoir may similarly be at least partially defined by a base of the capsule, again providing a compact and simple capsule design.

Alternatively, the at least one gas reservoir may be defined only by the plate and the base of the capsule, once again providing a compact and simple capsule design. This, in turn, can provide a capsule that is easier to design and manufacture than a capsule in which the gas reservoir requires other elements to define it, allowing for a lower-cost capsule.

The capsule may also advantageously comprise a membrane. Specifically, the at least one gas reservoir may be at least partially defined by a membrane that is sealed to a body of the capsule or to a membrane opening plate in the capsule. This can allow for a lighter-weight capsule than a capsule in which the at least one gas reservoir is defined by a heavier-weight element than a membrane.

The membrane itself may be any suitable surface which may be penetrated to allow fluid flow therethrough. The membrane may also be a film that is dissolvable or edible, such that it can run into the beverage and be consumed by the consumer. Thus, the membrane can provide separation of the beverage ingredient and gas, and dissolve after the gas has been incorporated into the beverage.

The gas reservoir or chamber within the capsule may comprise a series of gas sub-reservoirs each containing gas. Each of the gas sub-reservoir may advantageously be in fluid communication with the opening of the at least one gas reservoir to allow the gas to enter and interact with the fluid flow passing through the capsule. The division of the gas reservoir into gas sub-reservoirs can help to make a capsule with such sub-reservoirs structurally stronger than a capsule with an undivided gas reservoir.

The capsule may contain a single fluid flow path in combination with one or more gas reservoirs. Alternatively, the capsule may comprise a plurality of liquid flow paths and a plurality of gas reservoirs wherein the plurality of gas reservoirs each has an opening adjacent a liquid flow path. In such an arrangement a higher degree of contact and interaction between fluid and gas can be achieved in a shorter period of time. In effect the fluid flow is split into a plurality of paths and each path is arranged to flow past a gas reservoir. For example, there may be a pair of fluid flow paths and a corresponding pair of gas reservoirs, each with a respective opening adjacent to one of the fluid flow paths.

The gas reservoir may have a single opening in communication with a respective fluid flow path. Thus, all of the gas within the reservoir leaves the reservoir from a single outlet and enters a fluid flow path. Thus, even if the fluid reaches one flow channel before another, equilibrated aeration can be ensured. Further, by arranging a single opening in communication with a respective fluid flow path, once some has left the gas reservoir, fluid can be drawn into the reservoir, which can help homogenization of the fluid.

The capsule may advantageously have an internal volume that is the volume delimited by walls of the ingredient chamber, a top of the ingredient chamber and a base of the capsule. More specifically the at least one gas reservoir may have a total volume that is at least 5% of the internal volume of the capsule. Alternatively, the at least one gas reservoir may have a total volume that is at least 10% of the internal volume of the capsule. These volumes of air provide sufficient gas entrapment in the liquid to provide a foam that is agreeable to a consumer.

The capsule is preferably arranged such that, in use, the opening is in continuous communication with the gas reservoir.

The opening adjacent to a flow path of liquid through the capsule may be configured such that the cross-sectional area of the opening is less than the cross-sectional area of the flow path adjacent to the opening. The opening adjacent to a flow path of liquid through the capsule may be configured such that the cross-sectional area of the opening is less than half the cross-sectional area of the flow path adjacent to the opening. The inventors have established that such a ratio provides an advantageous foam-forming effect within the capsule.

The capsule may be arranged such that the height of the fluid flow path adjacent the opening is between 0.1 mm and 1.5 mm and the width of the fluid flow path adjacent the opening is between 0.1 mm and 1.5 mm. The capsule may be arranged such that the height of the fluid flow path adjacent the opening is less than 1.0 mm and the width of the fluid flow path adjacent the opening is less than 1.0 mm. The opening adjacent to a flow path of liquid through the capsule may be configured such that the width and height of the opening are each less than 0.5 mm.

The capsule may be arranged such that a height of the fluid flow path adjacent the opening is 0.4 mm and a width of the fluid flow path adjacent the opening is 0.4 mm.

The capsule may comprise an edible dissolvable seal that fluidically seals the at least one gas reservoir from the liquid flow path and wherein the capsule is arranged such that when the seal dissolves, the gas reservoir is then in fluid communication with the flow path. Thus, the reservoir can be sealed until the capsule is used and fluid begins to flow through the capsule.

The gas which is contained in the reservoir of chamber may be any suitable gas. For example, the gas may be selected from one or a combination of atmospheric air or an inert gas such as nitrogen. Depending on the ingredients it may be preferable to use an inert pure gas as opposed to atmospheric gas which is easier to source at the manufacturing stage but which contains a mixture of gases.

BRIEF DESCRIPTION OF THE DRAWINGS

Embodiments of the invention will now be described by way of example with reference to the following figures.

In accordance with one (or more) embodiments of the present invention the Figures show the following.

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including, but not limited to".

The invention is further described with reference to the following examples. It will be appreciated that the invention as claimed is not intended to be limited in any way by these examples.

DETAILED DESCRIPTION

Figure 1:
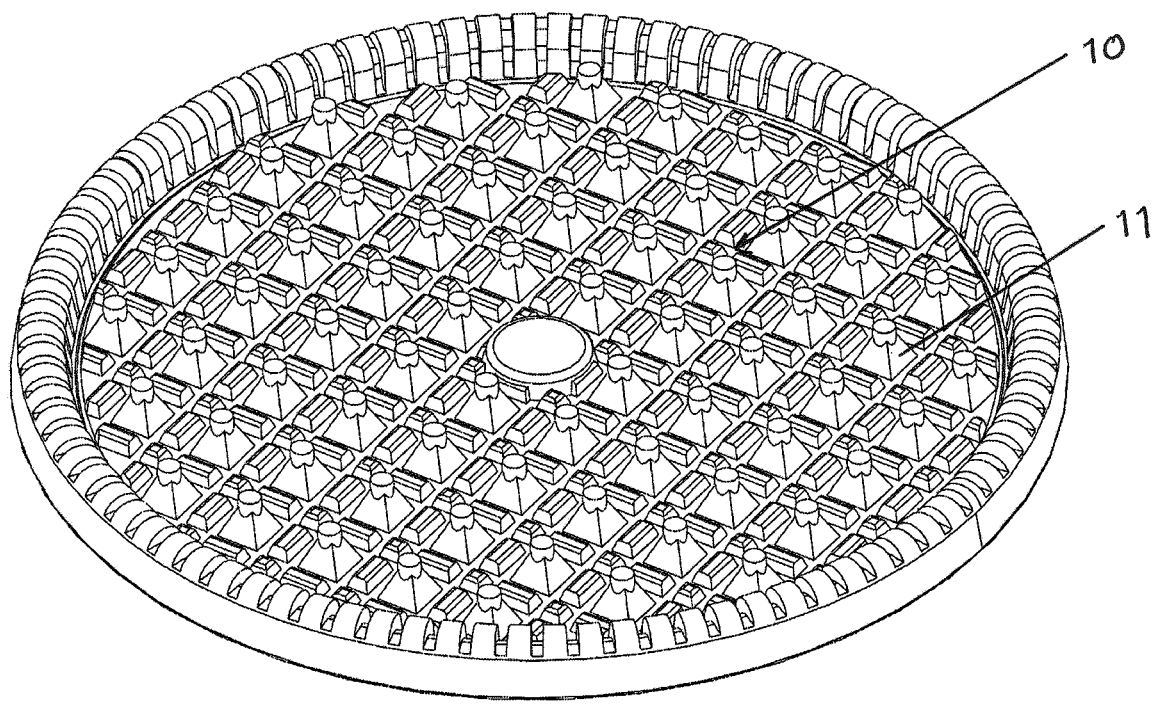
FIG. 1 shows a perspective view of a top surface of a plate that partially defines a gas reservoir within a capsule.
Figure 2:
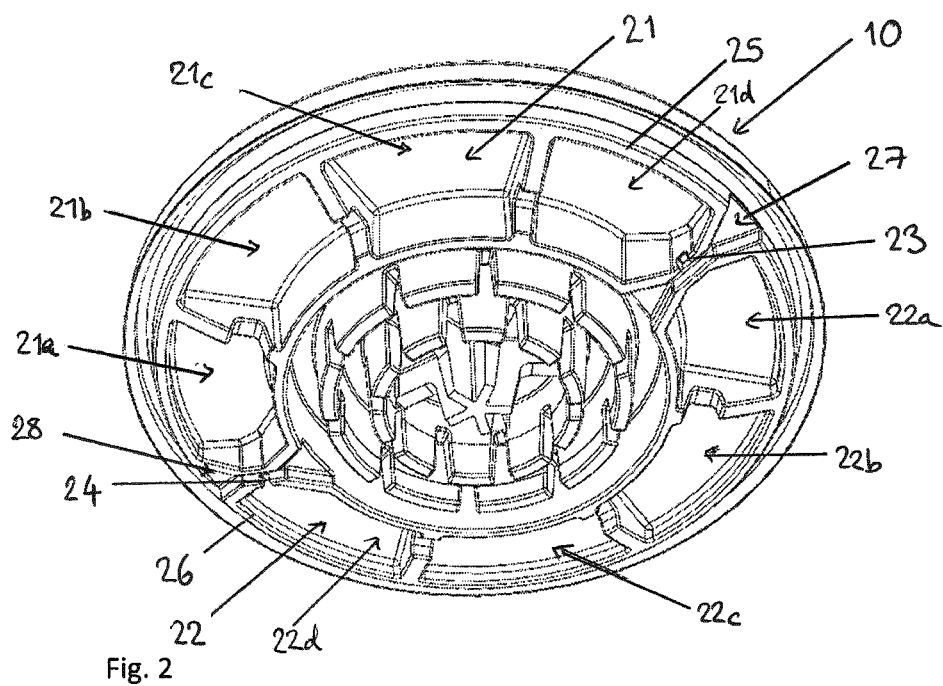
FIG. 2 shows a perspective view of the bottom surface of the plate.
Figure 3:
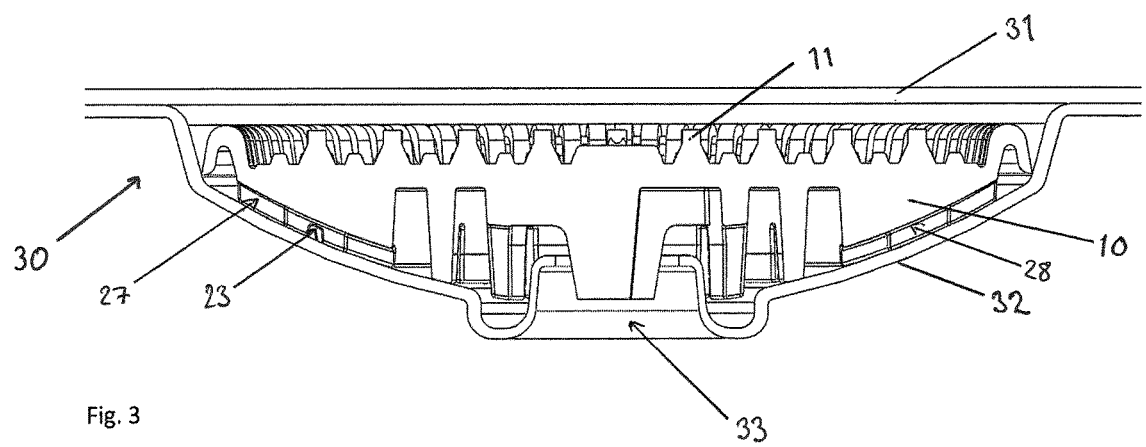
FIG. 3 shows a cross-sectional view of the plate within part of the capsule.

FIG. 1 shows a perspective view of a top surface of a plate 10 that partially defines gas reservoirs 21, 22 (shown in FIG. 2) within a capsule 30 (shown partially in FIG. 3).

The capsule 30 is for use in a beverage preparation machine, for preparing a beverage with a foam. In this example, the capsule 30 has elements of a conventional capsule design that enable it to be inserted into a beverage preparation machine as described in the "Background" section and to have liquid (for example water) introduced into it so as to mix with a beverage ingredient (for example milk powder) before leaving the capsule 30 as a beverage.

The capsule 30 has an ingredient chamber for containing an ingredient for preparing the beverage. The ingredient chamber is not shown. In use, it is located above the part of the capsule 30 shown in FIG. 3.

Returning to FIG. 1, in this example, the plate 10 is a rigid plate 10 that comprises an opening means in the form of protrusions 11 able to pierce a membrane 31 of the capsule (shown in FIG. 3) during use of the capsule. An example of such an arrangement (without the gas reservoirs) can be found in European patent application number EP1472156B1, incorporated herein by reference.

Turning now to FIG. 2, as mentioned above, the plate 10 partially defines gas reservoirs 21, 22 containing gas. In this example, the gas is atmospheric air. In other examples, it can be an inert gas, for example nitrogen. The gas reservoirs 21, 22 are located on the opposite side of the plate 10 to the protrusions 11. The gas reservoirs 21, 22 are defined axially by respective walls 24, 25. The walls protrude axially from the plate 10 so as to partially define the reservoirs 21, 22 in an axial direction. The gas reservoirs 21, 22 each have an opening 23, 24 within the capsule 30. The openings 23, 24 are also defined axially by the respective walls 25, 26. The openings 23, 24 each take the form of a part of the walls 25, 26 that is lower in height than the remainder of the walls 25, 26. The walls 25, 26 also partially define part of a flow path for liquid through the capsule 30 by defining respective channels 27, 28. This flow path will be described in more detail below with reference to FIG. 6. The openings 23, 24 are adjacent the channels 27, 28. This puts the gas reservoirs 21, 22 in fluid communication with the flow path. The gas reservoirs 21, 22 are arranged such that, in use, liquid flowing past the opening entrains gas from the gas reservoir to form a foam-like mixture of air and liquid.

In this example, there are two liquid flow paths and two gas reservoirs 21, 22, each with a single respective opening 23, 24 adjacent one of the liquid flow paths. Viewed axially, the plate 10 is circular, so as to fit within a capsule 20 of conventional dimensions. A first gas reservoir 21 extends around part of the circumference of the plate 10, defined axially by a wall 25. This wall 25 extends in a tangential direction at a first radial distance around the plate 10, radially inwards at two ends, and in a tangential direction at a second radial distance around the plate 10. The second gas reservoir 22 has the same shape as the first gas reservoir 21, and extends around another part of the circumference of the plate 10. Between the two reservoirs 21, 22, in a circumferential direction, are two channels 27, 28. These channels 27, 28 extend radially from the edge of the plate 10 towards its centre. The channels 27, 28 are partially defined by the parts of the walls 25, 26 that extend radially inwards.

In this example, each gas reservoir 21, 22 comprises a series of gas sub-reservoirs 21a-d, 22a-d, containing gas. These gas sub-reservoirs 21a-d, 22a-d are defined axially by the walls 25, 26. In other words, the walls 25, 26 sub-divide the gas reservoirs 21, 22 in a radial direction into a series of compartments. A part of the walls 25, 26 between each of the gas sub-reservoirs 21a-d, 22a-d is axially lower in height than the rest of the wall between the gas sub-reservoirs 21a-d, 22a-d. This creates an opening between the each of the gas sub-reservoirs 21a-d, 22a-d of a gas reservoir 21, 22. Thus each gas sub-reservoir 21a-d, 22a-d is in fluid communication with the opening 23, 24 of the gas reservoirs 21, 22.

In an alternative example, the gas reservoir or reservoirs can be at least partially defined by a membrane that is sealed to a body of the capsule 30. In such an example, the membrane can be dissolvable and edible.

The plate 10 is shown in situ in the capsule 30 in FIG. 3. The plate 10 is located (when the capsule 30 is oriented for use in a beverage-making machine) below a membrane 31 that is arranged to be pierced by the protrusions 11. The above-described walls 25, 26 abut a base 32 of the capsule 20. The base 32 of the capsule 20 therefore also partially defines the gas reservoirs 21, 22, sub-reservoirs 21a-d, 22a-d, openings 23, 24 and flow path for the liquid through the capsule 30. The base 32 defines these features in a radial or near-radial plane. The base 32 further defines an outlet 33 for liquid from the capsule 30. The outlet 33 takes the form of an opening located at the axis of the base 32.

Figure 4:
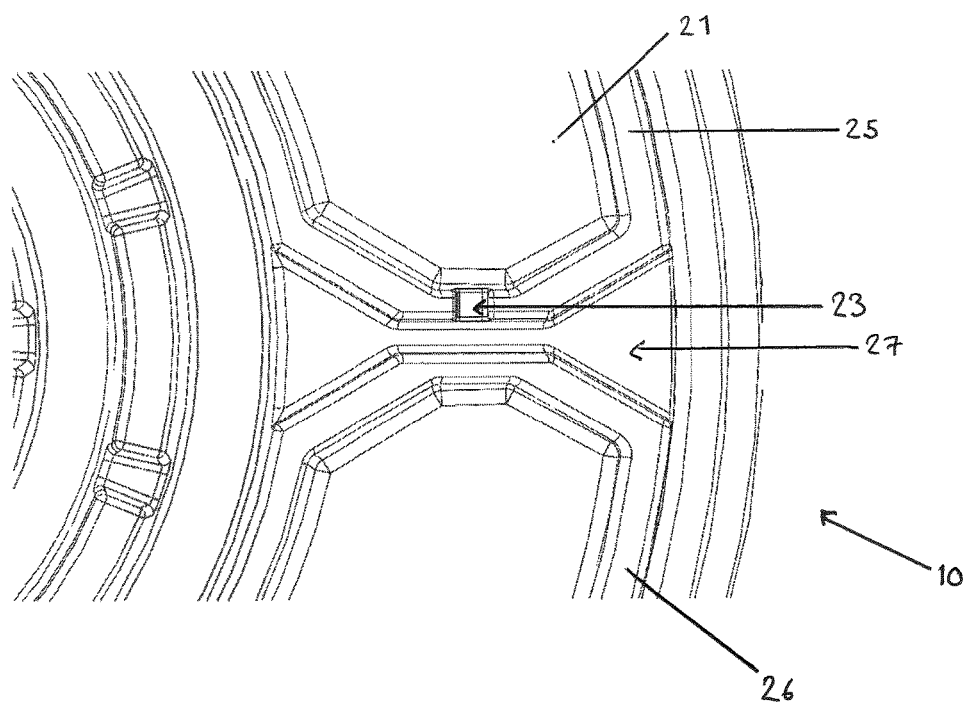
FIG. 4 shows an enlarged view, in an axial direction, of an opening of the gas reservoir onto a fluid flow path.

FIG. 4 shows an enlarged view, in an axial direction, of an opening 23 of the first gas reservoir 21 onto a fluid flow path in the form of a first channel 27. As discussed above, the channel 27 is defined in the axial direction of the capsule 30 by the parts of the walls 25, 26 that extend radially inwards. The channel 27 is narrower adjacent the opening 23 than it is at its ends. In other words, in this example, the walls 25, 26 are arranged such that in a radial plane—that is, between the walls 25, 26—following the channel 27 radially inwardly along its length, the channel 27 is relatively broad near the edge of the plate 10, relatively narrow adjacent the opening 23 and relatively broad at the end closest to the centre of the plate 10. Thus, as will be described further below with reference to FIG. 6, liquid flowing radially inwards along the channel 27 reduces in pressure when it passes the opening 23, since this section of the channel 27 is narrower than the section where the fluid enters the channel 27.

In this example, the width of the channel 27 adjacent the opening 23 is 0.4 mm. The height of the channel 27 adjacent the opening 23 is also 0.4 mm. In other examples, the width and height can each be between 0.1 mm and 1.5 mm. The width and height of the opening 23 are each 0.2 mm. Thus, in this example, the cross-sectional area of the opening 23 is less than half the cross-sectional area of the flow path adjacent to the opening. This can help to encourage liquid flow past the opening 23 instead of into the opening 23.

Figure 5:
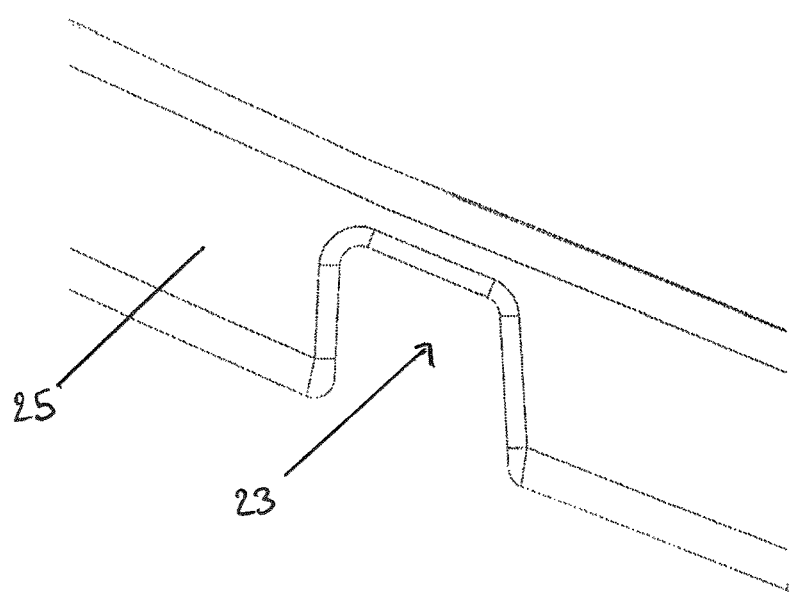
FIG. 5 shows an enlarged view, in a radial direction, of the opening.

FIG. 5 shows an enlarged view of the opening 23 and the wall 25 that partially defines it. It illustrates how the wall 25 partially defines the opening 23 by having a smaller axial height in the region of the opening 23 than elsewhere.

The above description of the opening 23 of the first reservoir 21 onto the first channel 27 applies equally to the opening 24 of the second reservoir 22 onto the second channel 28 since the two gas reservoirs 21, 22 have the same shape as one another.

Figure 6:
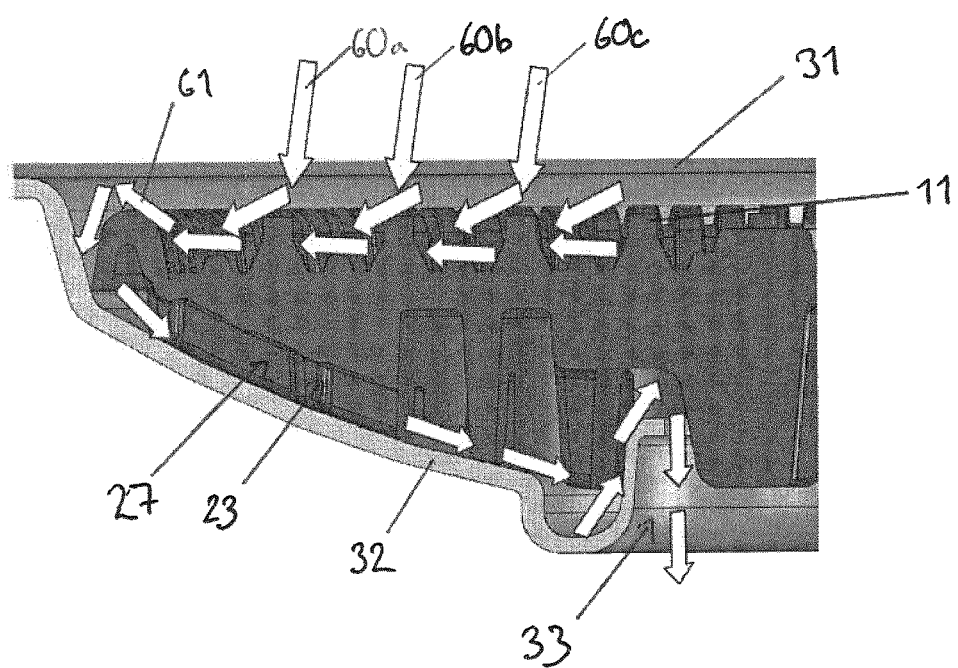
FIG. 6 shows a cross-sectional view of part of the plate within the capsule, also showing part of a flow path for liquid through the capsule.

A flow path for liquid through the part of the capsule 30 containing the plate 10 will now be described with reference to FIG. 6. When the membrane 31 is pierced by the protrusions 11, liquid flows approximately axially through the membrane in streams 60a, 60b, 60c. These streams 60a, 60b, 60c join to form a radial stream 61 that flows towards the edge of the plate 10. Here, the stream 61 flows over a lip of the plate 10. The flow path of the stream 61 is thereafter defined by the walls 25, 26 and the base 32 of the capsule 30. The stream 61 meets the circumferential parts of the walls 25, 26 such that it flows circumferentially until it encounters the channels 27, 28. It then flows radially inwards along the channels 27, 28, past the openings 23, 24. As mentioned above in relation to FIG. 4, the channels 27, 28 are narrower adjacent the openings 23, 24 than elsewhere on their length. Thus, liquid flowing radially inwards along the channel 27 reduces in pressure when it passes the opening 23. In passing the openings 23, 24, the liquid entrains gas from within the gas reservoirs 21, 22. The liquid and gas mixture thus formed continues to flow radially inwards. It flows through a relatively broader section of the channels 27, 28, causing turbulence which can help mixing. The liquid and gas mixture flows radially inwards until it meets the outlet 33 formed by the base 32, whereupon it flows approximately axially downwards and out of the capsule 30.

Figure 7:
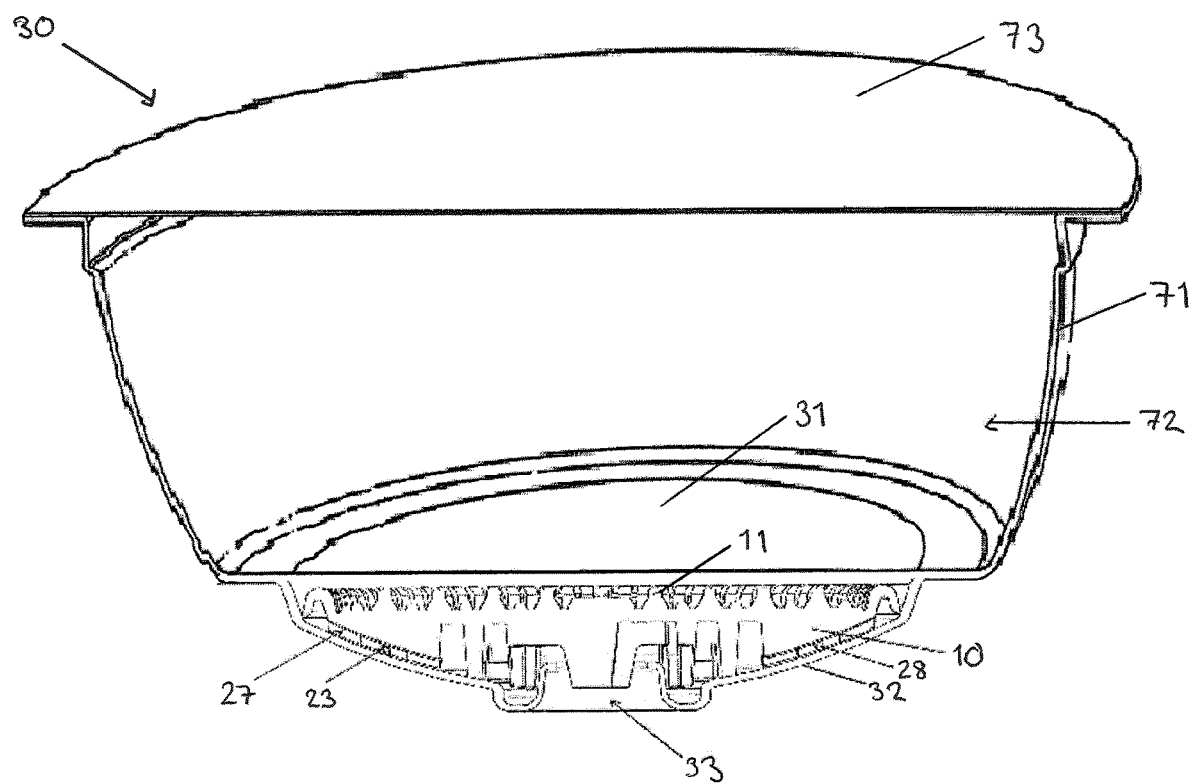
FIG. 7 shows a cross-sectional view of the plate within the capsule.

FIG. 7 shows illustrates a typical construction of a capsule 30 according to the present disclosure. The capsule comprises side walls 71, defining an ingredient chamber 72 (e.g. a roast and ground coffee powder, or a soluble ingredient such as milk, chocolate, soluble coffee or soup). The ingredient chamber 72 is closed at its top by a pierceable membrane 73 that typically is pierced by a water injection needle of a beverage-making machine, in use. The bottom of the ingredient chamber is closed by the membrane 31 which is openable by the plate 10. The plate 10 is preferably inserted outside of the ingredient chamber 72, but within the boundaries of the ingredient chamber's body, as illustrated in FIG. 7.

The capsule 30 has an internal volume that in this example is the volume delimited by the side walls 71 of the ingredient chamber 72, the piercable membrane 73 and the base 22. In this example, the gas reservoirs have a total volume that is at least 10% of this internal volume of the capsule 30. In other examples, the total volume can be less; for example it can be at least 10% of the internal volume of the capsule 30.

As a concrete example, the proposed capsule 30 may be used for the preparation of milk with a foam. Alternatively, ingredients such as roasted ground coffee, tea, instant coffee, a mixture of roasted ground coffee and instant coffee, a syrup concentrate, a fruit extract concentrate, a chocolate product, or any other dehydrated edible substance, such as dehydrated stock can be used in the capsule to create other beverages with a foam.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A capsule for use in a beverage preparation machine for preparing a beverage with a foam, the capsule comprising:
   side walls defining an ingredient chamber configured for containing an ingredient for preparing the beverage;
   a top membrane configured to close a top of the ingredient chamber;
   a membrane or frangible capsule wall configured to close a bottom of the ingredient chamber;
   a rigid plate configured to open the membrane or frangible capsule wall; and
   at least one gas reservoir configured to contain gas, the at least one gas reservoir is at least partially defined by the rigid plate and by walls axially protruding from the rigid plate;
   the at least one gas reservoir having an opening in the walls axially protruding from the rigid plate within the capsule, the opening adjacent a flow path of liquid through the capsule such that the at least one gas reservoir is in fluid communication with the flow path, the at least one gas reservoir arranged such that the liquid flowing past the opening entrains the gas from the gas reservoir to form a foam-like mixture of gas and liquid.

2. The capsule of claim 1 wherein the at least one gas reservoir is at least partially defined by a body of the capsule.

3. The capsule of claim 1, wherein the at least one gas reservoir is defined only by the rigid plate and a base of the capsule.

4. The capsule of claim 1, wherein the at least one gas reservoir is at least partially defined by the membrane or frangible capsule wall that is sealed to a body of the capsule or to the rigid plate in the capsule.

5. The capsule of claim 1, wherein the at least one gas reservoir comprises a series of gas sub-reservoirs, each gas sub-reservoir containing gas and in fluid communication with the opening of the at least one gas reservoir.

6. The capsule of claim 1, comprising a plurality of liquid flow paths and a plurality of gas reservoirs, each gas reservoir of the plurality of gas reservoirs has an opening adjacent a liquid flow path of the plurality of liquid flow paths.

7. The capsule of claim 6, wherein the plurality of liquid flow paths comprises two liquid flow paths, and wherein the plurality of gas reservoirs comprises two gas reservoirs, each gas reservoir including a respective opening adjacent one of the two liquid flow paths.

8. The capsule of claim 1, wherein the at least one gas reservoir has a single opening.

9. The capsule of claim 1, wherein the capsule has an internal volume delimited by walls of the ingredient chamber, the top membrane of the ingredient chamber, and a base of the capsule, wherein the at least one gas reservoir has a total volume that is at least 5% of the internal volume of the capsule.

10. The capsule of claim 1, wherein the capsule is arranged such that the opening is in continuous communication with the at least one gas reservoir.

11. The capsule of claim 1, wherein a cross-sectional area of the opening is less than half of a cross-sectional area of the flow path adjacent to the opening.

12. The capsule of claim 1, wherein a height of the flow path adjacent the opening is between 0.1 mm and 1.5 mm and a width of the flow path adjacent the opening is between 0.1 mm and 1.5 mm, and wherein the width and height of the opening are each less than 0.5 mm.

13. The capsule of claim 1, wherein the axially protruding walls define channels that partially define a part of the flow path.

14. The capsule of claim 1, wherein the ingredient contained in the ingredient chamber comprises milk.

15. A capsule for use in preparing a beverage with a foam, the capsule comprising:
  side walls defining an ingredient chamber configured for containing an ingredient for preparing the beverage;
  a top membrane configured to close a top of the ingredient chamber;
  a membrane or frangible capsule wall configured to close a bottom of the ingredient chamber;
  a rigid plate configured to open the membrane or frangible capsule wall; and
  at least one gas reservoir configured to contain gas, the at least one gas reservoir is at least partially defined by the rigid plate and by walls axially protruding from the rigid plate;
  the at least one gas reservoir having an opening in the walls axially protruding from the rigid plate within the capsule, the opening adjacent a flow path of liquid through the capsule such that the at least one gas reservoir is in fluid communication with the flow path, the at least one gas reservoir arranged such that the liquid flowing past the opening entrains the gas from the gas reservoir to form a foam-like mixture of gas and liquid,
  wherein the gas is selected from one or a combination of atmospheric air, an inert gas, or nitrogen.

* * * * *